United States Patent
Kasada et al.

(10) Patent No.: US 10,598,313 B2
(45) Date of Patent: Mar. 24, 2020

(54) WORKING SHEATH TUBE AND ENVIRONMENTAL MAINTENANCE METHOD FOR RENOVATING OPERATION OF PUMP-DISCHARGE PIPE

(71) Applicant: CHIYODA CORPORATION, Yokohama-shi (JP)

(72) Inventors: Kingo Kasada, Yokohama (JP); Hidenori Muramatsu, Tokyo (JP); Hiroaki Suzuki, Tokyo (JP); Toshitake Sakurai, Tokyo (JP); Keiichi Uchiyama, Tokyo (JP)

(73) Assignee: Chiyoda Corporation, Kanagawa (JP)

( * ) Notice: Subject to any disclaimer, the term of this patent is extended or adjusted under 35 U.S.C. 154(b) by 108 days.

(21) Appl. No.: 15/559,347

(22) PCT Filed: Mar. 15, 2016

(86) PCT No.: PCT/JP2016/058146
§ 371 (c)(1),
(2) Date: Sep. 18, 2017

(87) PCT Pub. No.: WO2016/152653
PCT Pub. Date: Sep. 29, 2016

(65) Prior Publication Data
US 2018/0112830 A1    Apr. 26, 2018

(30) Foreign Application Priority Data
Mar. 20, 2015  (JP) .................................. 2015-057306

(51) Int. Cl.
*F17C 13/12*     (2006.01)
*F17C 13/00*     (2006.01)
*F16L 59/14*     (2006.01)

(52) U.S. Cl.
CPC .......... *F17C 13/126* (2013.01); *F16L 59/141* (2013.01); *F17C 13/004* (2013.01);
(Continued)

(58) Field of Classification Search
CPC ..... B65D 90/105; B65D 90/28; F17C 13/126; F17C 13/004; F17C 2201/032;
(Continued)

(56) References Cited

U.S. PATENT DOCUMENTS 3,068,561 A  *  12/1962  Jones ................... B65D 90/046
                                                       105/423
3,623,629 A  *  11/1971  Hendershot .......... B65D 90/046
                                                       220/327

(Continued)

FOREIGN PATENT DOCUMENTS

| JP | H0571600 U   | 9/1993 |
| JP | 2012154077 A | 8/2012 |
| JP | 2013167564 A | 8/2013 |

OTHER PUBLICATIONS

PCT International Search Report, PCT/JP2016/058146, dated Jun. 21, 2016, 4 pages.
(Continued)

*Primary Examiner* — Reinaldo Sanchez-Medina
*Assistant Examiner* — Nicole Gardner
(74) *Attorney, Agent, or Firm* — Quarles & Brady LLP

(57) ABSTRACT

A working sheath tube (1) is used when a renovating operation of a pump-discharge pipe (4) branched from a peripheral wall (33) of a tubular barrel (3) inserted into a tank (2) in which a fuel is retained. The working sheath tube has a bottomed tubular shape which can be inserted into the barrel, and has a working space thereinside. A insertion hole (15a) into which a closing member (7) for closing a pump-discharge pipe is inserted is provided on and penetrates a (Continued)

sheath tube peripheral wall (15). While the sheath tube is inserted into the barrel, the insertion hole faces an opening of the pump-discharge pipe.

9 Claims, 7 Drawing Sheets

(52) U.S. Cl.
CPC ...... *F17C 13/12* (2013.01); *F17C 2201/0104* (2013.01); *F17C 2201/032* (2013.01); *F17C 2201/052* (2013.01); *F17C 2205/0352* (2013.01); *F17C 2205/0391* (2013.01); *F17C 2209/221* (2013.01); *F17C 2221/033* (2013.01); *F17C 2223/0161* (2013.01); *F17C 2223/033* (2013.01); *F17C 2223/047* (2013.01); *F17C 2227/044* (2013.01); *F17C 2260/015* (2013.01); *F17C 2270/0134* (2013.01)

(58) Field of Classification Search
CPC ........ F17C 2205/0391; F17C 2223/047; F17C 2260/015; Y10T 137/4824; Y10T 137/86244; Y10T 137/86308; Y10T 137/86381; Y10T 137/0318; Y10T 137/0419

See application file for complete search history.

(56) References Cited

U.S. PATENT DOCUMENTS

| | | | |
|---|---|---|---|
| 5,505,327 A * | 4/1996 | Witt | B65D 90/046 220/495.06 |
| 2006/0162811 A1* | 7/2006 | Roach | F17C 3/005 141/325 |

OTHER PUBLICATIONS

PCT International Preliminary Report on Patentability, PCT/JP2016/058146, dated Sep. 26, 2017, 8 pages.

* cited by examiner

WORKING SHEATH TUBE AND ENVIRONMENTAL MAINTENANCE METHOD FOR RENOVATING OPERATION OF PUMP-DISCHARGE PIPE

CROSS-REFERENCE TO RELATED APPLICATIONS

This application represents the national stage entry of PCT International Application No. PCT/JP2016/058146 filed Mar. 15, 2016 and claims priority to Japanese Patent Application No. 2015-057306 filed Mar. 20, 2015. The contents of these applications are hereby incorporated by reference as if set forth in their entirety herein.

TECHNICAL FIELD

The present invention relates to a working sheath tube and an environmental maintenance method for a renovating operation of a pump-discharge pipe.

BACKGROUND ART

Conventionally, facilities configured to include a tank for retaining a cold liquefied gas and a plurality of pump barrels for driving out the cold liquefied gas retained in this tank are known. This pump barrel is configured to include a barrel drooped into the tank, a delivery pump provided in an interior of the barrel to suck up the retained liquid, and a pump-discharge pipe for discharging the sucked liquid to outside when driving the delivery pump.

These barrel, delivery pump, and pump-discharge pipe will be deteriorated with age or the like. In this way, the deteriorated components need to be repaired, exchanged for new ones, or altered, namely, renovated.

When renovating the deteriorated components, it is necessary to once fully drive out the cold liquefied gas retained in the tank, renovate the deteriorated components, and then return the cold liquefied gas into the tank. Here, when handling the cold liquefied gas, an equipment management such as temperature control is needed, and many days and costs are required.

An art to solve this problem is disclosed in Patent Literature 1. FIG. 7 is a perspective view showing an example of a conventional purge device for pump barrel 101 disclosed in Patent Literature 1.

As shown in FIG. 7, the conventional purge device for pump barrel 101 is configured to include: a tank 102 in which the cold liquefied gas, namely, liquefied petroleum gas or liquefied natural gas is retained; a tubular barrel 103 drooped in the tank 102; a delivery pump 104 installed in an interior of the barrel 103; a pump-discharge pipe 105 carrying the retained liquid when driving the delivery pump 104; a gas introduction pipe 106 for introducing a gas same as the retained liquid from a vicinity of an upper opening of the barrel 103 into the barrel 103 under pressure; and an inert gas introduction pipe 107 for introducing inert gas from a vicinity of a lower opening of the barrel 103 into the barrel 103 under pressure. The barrel 103 is provided with a foot valve 108 which is released owing to a weight of the delivery pump 104 when the delivery pump 104 is installed.

In such a conventional purge device for pump barrel 101, when pulling out the delivery pump 104 as the deteriorated component, firstly, the delivery pump 104 is slightly moved up to close the foot valve 108. At this time, the retained liquid remains in the barrel 103. Then, the inert gas is introduced into the barrel 103 via the inert gas introduction pipe 107 under pressure. Then, the foot valve 108 is opened, and the retained liquid is pushed back to the tank 102. Next, an active gas is sucked out from the gas introduction pipe 106 to reduce the gas pressure in the barrel 103. After the gas pressure is reduced, the inert gas is introduced into the barrel 103 from the inert gas introduction pipe 107. In this way, after the active gas in the barrel 103 is replaced with the inert gas, the delivery pump 104 is removed. Since the barrel 103 is filled with the inert gas, the delivery pump 104 is removed safely without a risk of ignition by touching oxygen in air or the like.

Thus, with the conventional purge device for pump barrel 101, the delivery pump 104 as the deteriorated component can be replaced, namely, renovated without driving out the liquid retained in the tank 102 while the tank 102 is operated.

CITATION LIST

Patent Literature

Patent Literature 1: JP H05-71600 U

SUMMARY OF INVENTION

Technical Problem

However, the conventional purge device for pump barrel 101 is a device for exchanging the delivery pump 104, and not for repairing the pump-discharge pipe 105 safely with hot work. Namely, when a part of the pump-discharge pipe 105 is deteriorated such as cracked, this part is repaired by welding. Therefore, in the conventional purge device for pump barrel 101, even when the barrel 103 is filled with the inert gas, the retained liquid (or fuel gas) may be leaked slightly from the foot valve 108 into the barrel 103. Therefore, when the welding operation is carried out under this condition, there is a possibility to ignite the leaked retained liquid (or fuel gas). In other words, in the conventional purge device for pump barrel 101, the renovating operation of the pump-discharge pipe 105 cannot be executed safely without removing the contents in the tank 102.

The present invention has been made in view of the above background, and an object of the present invention is to provide a working sheath tube for an environmental maintenance allowing a safety renovating operation of a pump-discharge pipe, and to provide an environmental maintenance method for the renovating operation of the pump-discharge pipe.

Solution to Problem

The above object is solved by the present invention below. Namely, according to a first aspect of the present invention, there is provided a working sheath tube used when a renovating operation of a pump-discharge pipe branched from a periphery of a tubular barrel inserted into a tank in which a fuel is retained, said sheath tube having a bottomed tubular shape which can be inserted into the barrel, and having a working space thereinside, wherein a insertion hole for installation of a closing member for closing a pump-discharge pipe, which is provided on and penetrates a sheath tube peripheral wall, and wherein while the sheath tube is inserted into the barrel, the insertion hole facing an opening of the pump-discharge pipe.

According to a second aspect of the present invention, there is provided the working sheath tube as described in the first aspect further including:

a partitioning member provided in a ring shape for surrounding the insertion hole in a gap between the barrel and the sheath tube peripheral wall while inserted into the barrel to separate inside from outside of the ring.

According to a third aspect of the present invention, there is provided the working sheath tube as described in the second aspect, wherein the partitioning member includes:

a standing portion standing in a tubular shape from a peripheral edge or a vicinity of the insertion hole; and a packing fitted to an exterior of the standing portion, and wherein while the sheath tube is inserted into the barrel, the packing is closely attached to an inner periphery of the barrel.

According to a fourth aspect of the present invention, there is provided the working sheath tube as described in any one of the first to third aspects, a positioning portion for positioning the barrel in a radial direction while the sheath tube is inserted into the barrel is provided on an end of the sheath tube in an insertion direction side.

According to a fifth aspect of the present invention, there is provided the working sheath tube as described in any one of the first to fourth aspects, an inclination correction portion for correcting an inclination of the sheath tube with respect to the barrel while the sheath tube is inserted into the barrel is provided on the peripheral wall at a position opposite to the insertion hole.

According to a sixth aspect of the present invention, there is provided the working sheath tube as described in any one of the first to fifth aspects, an oxygen meter for measuring an oxygen concentration in the working space is provided.

According to a seventh aspect of the present invention, there is provided the working sheath tube as described in any one of the first to sixth aspects, a gas detector for detecting flammable gas in the working space is provided.

According to an eighth aspect, there is provided an environmental maintenance method for the renovating operation of the pump-discharge pipe using the working sheath tube as described in any one of the first to seventh aspects, said method including the sequential steps of:

a blocking step to block a flow path from the tank to the barrel;

a sheath tube arrangement step to insert the sheath tube into the barrel and to arrange the insertion hole facing the opening of the pump-discharge pipe;

a purge step to discharge an inert gas from a side of the pump-discharge pipe away from the barrel toward the barrel to purge the working space with the inert gas;

a pump-discharge pipe closing step to close the pump-discharge pipe by inserting the closing member through the insertion hole into the pump-discharge pipe.

According to a ninth aspect, there is provided the environmental maintenance method for the renovating operation of the pump-discharge pipe as described in the eighth aspect, wherein the closing member is a hexaplug.

Advantageous Effects of Invention

According to the invention of the first aspect, while the sheath tube is inserted into the barrel, the insertion hole faces an opening of the pump-discharge pipe. In this condition, for example, when an operator enters the working space of the working sheath tube, and the closing member is inserted into the opening of the pump-discharge pipe via the insertion hole, the opening of the pump-discharge pipe is closed. Then, the liquid or the gas is prevented from entering the pump-discharge pipe from the barrel side opening. In this condition, when the interior of the pump-discharge pipe is purged with the inert gas, an environment allowing a safety hot work associated with a renovating operation of the pump-discharge pipe can be maintained.

Further, owing to using such a working sheath tube, the pump-discharge pipe solely required to be renovated can be renovated while the operation of the tank is maintained without driving out the whole fuel in the tank. Therefore, an renovating operation process is simplified, and for example, an equipment management such as temperature control when the fuel in the tank is driven out or returned becomes unnecessary. Thereby, the time necessary for this operation is greatly reduced. Because the working sheath tube has a bottomed tubular shape, when operating in the working space thereof, tools or the like are surely prevented from dropping into the barrel. Accordingly, a low-cost safety environment allowing a safety hot work which can be completed in a short time can be maintained.

According to the invention of the second aspect, the working sheath tube further includes a partitioning member provided in a ring shape for surrounding the insertion hole in a gap between the barrel and the peripheral wall, while inserted into the barrel to separate inside from outside of the ring. Thereby, even the fuel gas is contained in the atmosphere in the gap between the barrel and the peripheral wall of the working sheath tube, the fuel gas is prevented from entering the working space from the insertion hole.

According to the invention of the third aspect, the partitioning member includes: a standing portion standing in a tubular shape from a peripheral edge and a vicinity of the insertion hole; and a packing fitted to an exterior of the standing portion. Further, while the partitioning member is inserted into the barrel, the packing is closely attached to an inner periphery of the barrel. Thereby, even if the fuel gas is contained in the atmosphere in the gap between the barrel and the peripheral wall of the working sheath tube, by separating inside from outside of the ring, a structure to prevent the fuel gas from entering the working space from the insertion hole can be realized.

According to the invention of the fourth aspect, a positioning portion for positioning the barrel in a radial direction while the sheath tube is inserted into the barrel is provided on an end of the sheath tube in an insertion direction side. Thereby, it becomes unnecessary to move the working sheath tube uselessly when the working sheath tube is inserted into the barrel, and the working sheath tube can be inserted smoothly while preventing the working sheath tube from knocking against an inner surface of the barrel.

According to the invention of the fifth aspect, an inclination correction portion for correcting an inclination of the sheath tube with respect to the barrel while the sheath tube is inserted into the barrel is provided on the peripheral wall at a position opposite to the insertion hole. Owing to providing this inclination correction portion, a dimension from the barrel to a vicinity of the inclination correction portion on the peripheral wall of the working sheath tube is determined, and thereby a gap dimension from the barrel to a peripheral edge of the insertion hole on the peripheral wall is determined. Here, for example, when the ring-shaped partitioning member is arranged to surround the insertion hole in the gap between the barrel and the peripheral wall, because the gap dimension from the barrel to the peripheral edge of the insertion hole on the peripheral wall is determined, the partitioning member surely separates inside from outside of the ring.

According to the invention of the sixth aspect, an oxygen concentration in the working space is measured, and the operator can operate in a safety environment in the working space.

According to the invention of the seventh aspect, the gas detection in the working space is carried out, and the operator can operate in a further safety environment in the working space.

According to the invention of the eighth aspect, a flow path from the tank to the barrel is blocked in a blocking step, the sheath tube is inserted into the barrel, and the insertion hole is arranged to face the opening of the pump-discharge pipe in a sheath tube arrangement step, an inert gas is discharged from a side of the pump-discharge pipe away from the barrel toward the barrel to purge the working space with the inert gas in a purge step, and the pump-discharge pipe is closed by inserting the closing member through the insertion hole into the pump-discharge pipe in a pump-discharge pipe closing step. owing to operating in such an order, while preventing the liquid or the gas from entering the pump-discharge pipe from the barrel side opening, an environment allowing a safety hot work associated with a renovating operation of the pump-discharge pipe can be maintained. Further, the pump-discharge pipe solely required to be renovated can be renovated while the operation of the tank is maintained without driving out the whole fuel in the tank. Thereby, a low-cost safety environment allowing a safety hot work can be maintained in a short time.

Further, owing to operating in such an order, the pump-discharge pipe solely required to be renovated can be renovated while the operation of the tank is maintained without driving out the whole fuel in the tank. Therefore, an renovating operation process is simplified, and for example, an equipment management such as temperature control when the fuel is driven out or returned becomes unnecessary. Thereby, the time necessary for this operation is greatly reduced. Accordingly, a low-cost safety environment allowing a safety hot work which can be completed in a short time can be maintained.

According to the invention of the ninth aspect, owing to using a hexaplug as the closing member, the opening of the pump-discharge pipe can be surely closed. Thereby, the liquid or the gas is surely prevented from entering the pump-discharge pipe from the barrel side opening.

DESCRIPTION OF EMBODIMENTS

Hereinafter, a working sheath tube, and an environmental maintenance method for a renovating operation of a pump-discharge pipe according to an embodiment as one exemplary aspect of the present invention will be explained with reference to FIGS. 1 to 6.

Figure 1:
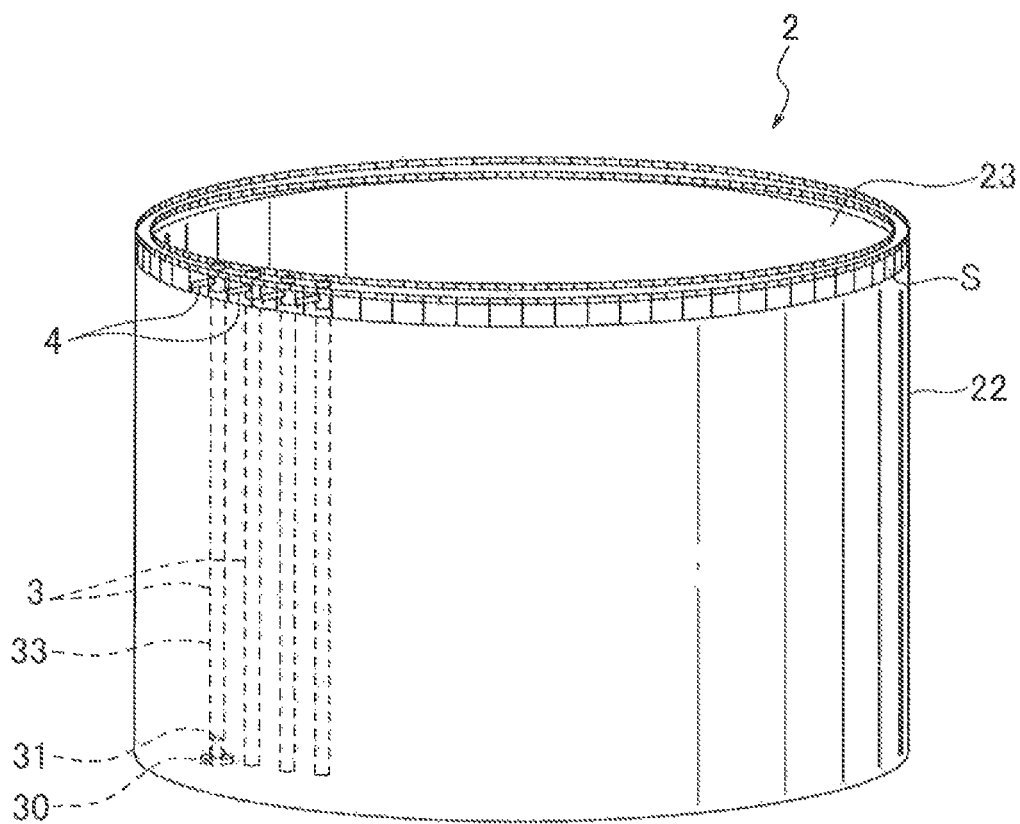
FIG. 1 is a perspective view showing a tank in which a working sheath tube according to an embodiment of the present invention is used, and a barrel to be inserted into the tank.

"A renovating operation of a pump-discharge pipe" in this specification means a general operation with respect to the pump-discharge pipe in the field such as a repair work or a modification of the pump-discharge pipe. FIG. 1 is a perspective view showing a tank 2 in which a working sheath tube 1 (shown in FIG. 2) is used when a renovating operation of a pump-discharge pipe 4 is carried out, and a barrel 3 to be inserted into the tank 2.

As shown in FIG. 1, the tank 2 is configured to include: a bottomed cylindrical storage 21 (not shown in FIG. 1, shown in FIG. 2) for storing LNG (liquefied natural gas) as fuel in a liquefied state; a cylindrical outer storage 22 covering a periphery of the storage 21; a dome-like roof 23 covering an upper opening of the storage 21; and a supporting structure (not shown) for supporting both the storage 21 and the outer storage 22. A gap between the storage 21 and the outer storage 22 is filled with a refrigerant (not shown) for preventing heat input from outside. LNG (liquefied natural gas) is retained in this tank 2 in a liquefied state.

In this embodiment, the liquefied "LNG" is used as the fuel retained in a tank. However, the present invention is not limited to this, and the liquefied "LPG (liquefied petroleum gas)" may be used in the liquid state or the gas state retained in the tank. Further, as long as used as the fuel, petrol (high-octane petrol and unleaded petrol), light oil, biofuel (biodiesel, biogas, and biomass ethanol), gaseous fuel (liquefied petroleum gas, natural gas, and hydrogen), ethylene, ammonia, and the like may be used.

In this tank 2, a working stage S where an operator works is installed upper than the roof 23. This working stage S is provided along a peripheral edge of the roof 23 of the tank 2.

Figure 2:
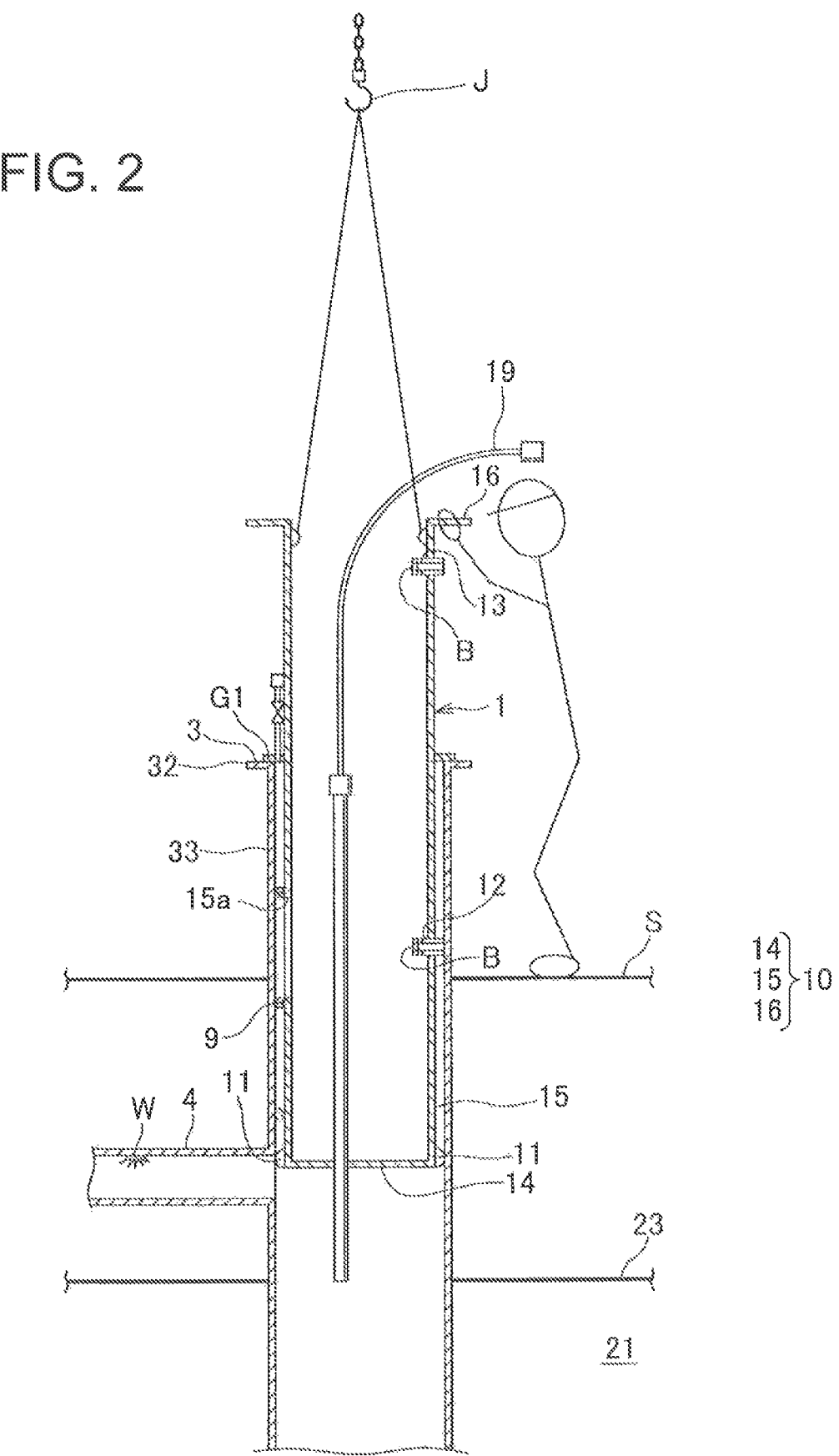
FIG. 2 is a sectional view showing the working sheath tube according to an embodiment of the present invention to be inserted into the barrel.

A cylindrical barrel 3 containing an in-tank pump 31 is fixed to such a tank 2. As shown in FIGS. 1 and 2, an axis of the barrel 3 is arranged vertically, a lower end of the barrel 3 is provided near a bottom of the tank 2, and an upper end of the barrel 3 is projected upper than the working stage S. This barrel 3 is provided with a barrel flange 32 extending in a flange shape from a peripheral edge of an upper opening of the barrel 3. The in-tank pump 31 to be installed in an interior of the barrel 3 is carried in/out through the upper opening of the barrel 3. In normal time when the renovating operation is not carried out, this upper opening is closed with a detachable head plate (not shown).

As shown in FIG. 1, a foot valve having a backflow prevention structure is attached to a fuel inlet as a lower opening of the barrel 3. This foot valve 30 is configured to include: a valve seat (not shown); a valve body (not shown) on which the in-tank pump 31 is seated; and a coil spring (not shown) for opening and closing a gap (hereinafter referred to as "valve") between the valve seat and the valve body by moving up and down the valve body. The valve body is provided lower than the valve seat (the bottom side of the tank 2). An axis of the coil spring is arranged vertically. The foot valve 30 is configured to be closed naturally when no force is applied to the coil spring, and to be opened when a force is applied to the coil spring and the coil spring is stretched.

In such a foot valve 30, when the in-tank pump 31 is seated on an upper face of the valve body, owing to the weight of the in-tank pump 31, the valve body is moved down, and the coil spring is stretched to open the valve. In this condition, a biasing force is acted on the coil spring in a compression direction. Further, when the in-tank pump 31 is uninstalled from the upper face of the valve body, owing to the biasing force (restoring force) of the coil spring, the valve body is moved up to close the valve.

Here, in a valve close state, despite the gap between the valve seat and the valve body is closed, the fuel inlet of the barrel 3 is not fully closed, and a slight amount of the retained liquid (or fuel gas) may be leaked from the valve to an interior of the barrel 3. Therefore, even in the valve close state, a deteriorated point W (shown in FIG. 2) of the pump-discharge pipe 4 cannot be renovated by a welding operation.

The in-tank pump 31 is configured to include a pump mechanism for sucking up the fuel. When the in-tank pump 31 is driven, the fuel retained in the tank 2 is drawn up from the fuel inlet of the barrel 3. This in-tank pump 31 is suspended while a wire (not shown) is fixed to an upper face thereof, seated on the foot valve 30 to open the valve, suspended to close the valve, and then pulled out from the barrel 3.

The pump-discharge pipe 4 distributes the fuel sucked by the in-tank pump 31. An interior of the pump-discharge pipe 4 is communicated with an interior of the barrel 3, and the pump-discharge pipe 4 is provided vertically in a tubular shape standing from a barrel peripheral wall 33 of the barrel 3. As shown in FIG. 2, an axis of the pump-discharge pipe 4 is arranged horizontally, and the pump-discharge pipe 4 is arranged in between the roof 23 of the tank 2 and the working stage S.

Meanwhile, the working sheath tube 1 according to this embodiment is used when renovating the pump-discharge pipe 4 branched from the peripheral wall 33 of the barrel 3 (periphery of the barrel 3) inserted into the tank 2 in which the fuel is retained. This working sheath tube 1 is used when renovating the pump-discharge pipe 4 or a bulb (not shown) attached to this pump-discharge pipe 4, and normally other than a renovating operation, detached from the barrel 3. This working sheath tube 1 is configured to include: a sheath tube main body 10 to be inserted into the barrel 3; a positioning portion 11 for positioning the sheath tube main body 10 in a radial direction of the barrel 3; and inclination correction portions 12, 13 for correcting an inclination with respect to the barrel 3.

The sheath tube main body 10 is configured to have a circular disc shaped sheath tube bottom wall 14, a sheath tube peripheral wall 15 standing up from a peripheral edge of the sheath tube bottom wall 14 in a cylindrical shape, and a sheath tube flange 16 extending in a flange shape from a peripheral edge of an end portion away from the sheath tube bottom wall 14. A working space is provided on an interior of the sheath tube main body 10. An outer diameter of this sheath tube main body 10 is one size smaller than an inner diameter of the barrel in a cylinder shape for allowing to be inserted into the barrel 3.

Figure 6:
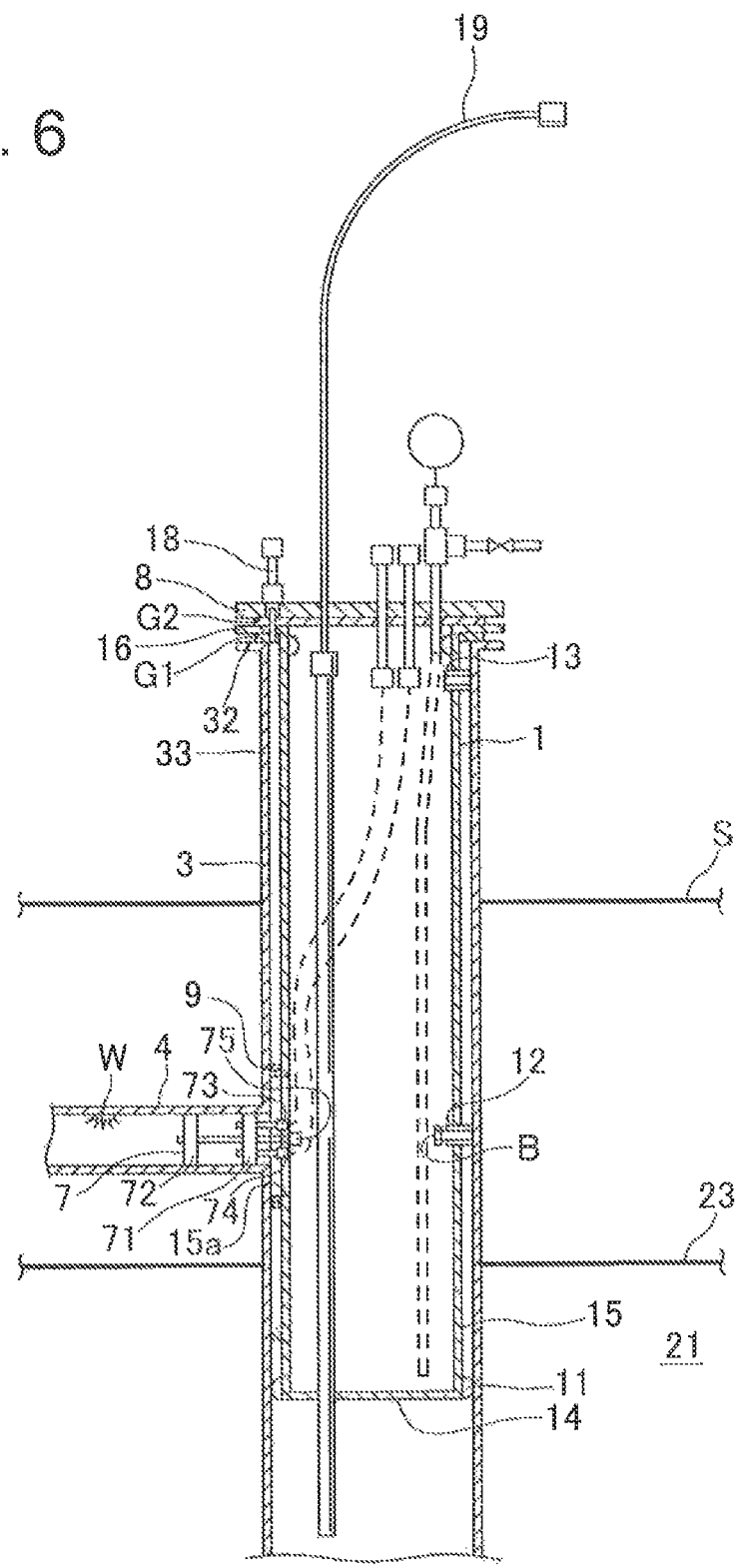
FIG. 6 is a sectional view continuing to an operation of FIG. 3, showing a condition that an environment of renovating a pump-discharge pipe is maintained.
Figure 7:
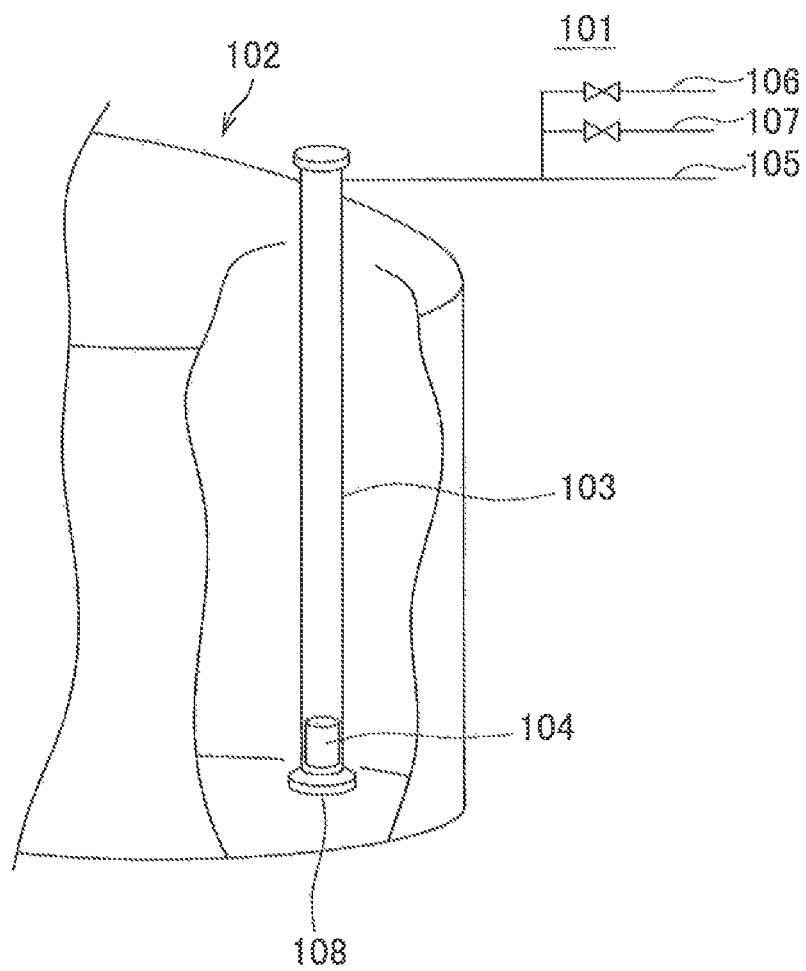
FIG. 7 is a perspective view showing an example of a conventional purge device for pump barrel disclosed in Patent Literature 1.

As shown in FIG. 6, an insertion hole 15a for inserting a hexaplug 7 (later described) as a closing member to close the pump-discharge pipe 4 is formed on the sheath tube peripheral wall 15. This insertion hole 15a is so formed as to face an opening of the pump-discharge pipe 4 in the barrel 3 while the sheath tube main body 10 is inserted into the barrel 3. A diameter of the insertion hole 15a is formed larger than an inner diameter of the pump-discharge pipe 4. Owing to such a dimensional relationship of the working sheath tube 1, an operator in the working space can close the pump-discharge pipe 4 while watching the whole opening of the pump-discharge pipe 4.

The positioning portion 11 is projected from an end of an insertion direction side of the sheath tube main body 10 outward in a radial direction of the sheath tube main body 10. Three positioning portions 11 are formed at regular intervals in a circumferential direction of the sheath tube main body 10. The three positioning portions are formed such that projection sizes of the three positioning portions are substantially the same. Owing to such a formation of the positioning portions 11, the sheath tube main body 10 inserted into the barrel 3 is positioned in a radial direction of the barrel 3. Namely, the sheath tube main body 10 inserted into the barrel 3 is arranged in the center of the barrel equally spaced from an inner periphery of the barrel 3.

In this embodiment, three positioning portions 11 are formed, and projection sizes thereof are substantially the same. However, the present invention is not limited to these. The number of the positioning portions 11 may be less than three or more than three. Further, the positioning portion 11 may be continuously formed throughout the whole periphery of the sheath tube main body 10.

The inclination correction portions 12, 13 are arranged at two positions spaced in an axial direction of the sheath tube main body 10. One of the two inclination correction portions 12, 13 (hereinafter referred to as the inclination correction portion 12) is arranged at a position facing the insertion hole 15a, and the other (hereinafter referred to as the inclination correction portion 13) is arranged higher than the one (away from the sheath tube bottom wall 14). In each of the inclination correction portions 12, 13, a bolt B is pushed in a predetermined dimension from an inner periphery side of the sheath tube main body 10 toward the barrel 3, thereby the sheath tube main body 10 is apart from the barrel 3 in the predetermined dimension, and the inclination of the sheath tube main body 10 with respect to the barrel 3 is corrected. However, with regard to the inclination correction portion 12, in relation to a block in the barrel 3, the inclination correction portions 12 may be provided at two positions horizontal to each other, namely, at two positions having the same heights away from the sheath tube bottom wall 14 upward in a predetermined distance. Incidentally, the inclination correction portion 12 corresponds to "the inclination correction portion" in claims.

Owing to such an arrangement that the inclination correction portion 12 is provided at a position facing the insertion hole 15a, the insertion hole 15a and the inclination correction portion 12 are arranged at the same height. Then, when the inclination of the sheath tube main body 10 with respect to the barrel 3 is corrected by the inclination correction portion 12, a distance from the barrel 3 to a vicinity of the inclination correction portion 12 on the sheath tube peripheral wall 15 is determined, and a distance from the barrel 3 to a peripheral edge of the insertion hole 15a on the sheath tube peripheral wall 15 is determined. In this way, owing to the determination of the distance from the barrel 3 to a peripheral edge of the insertion hole 15a on the sheath tube peripheral wall 15, a ring-shaped partitioning member 9 (later described) can surely separate inside from outside of the ring.

Figure 3:
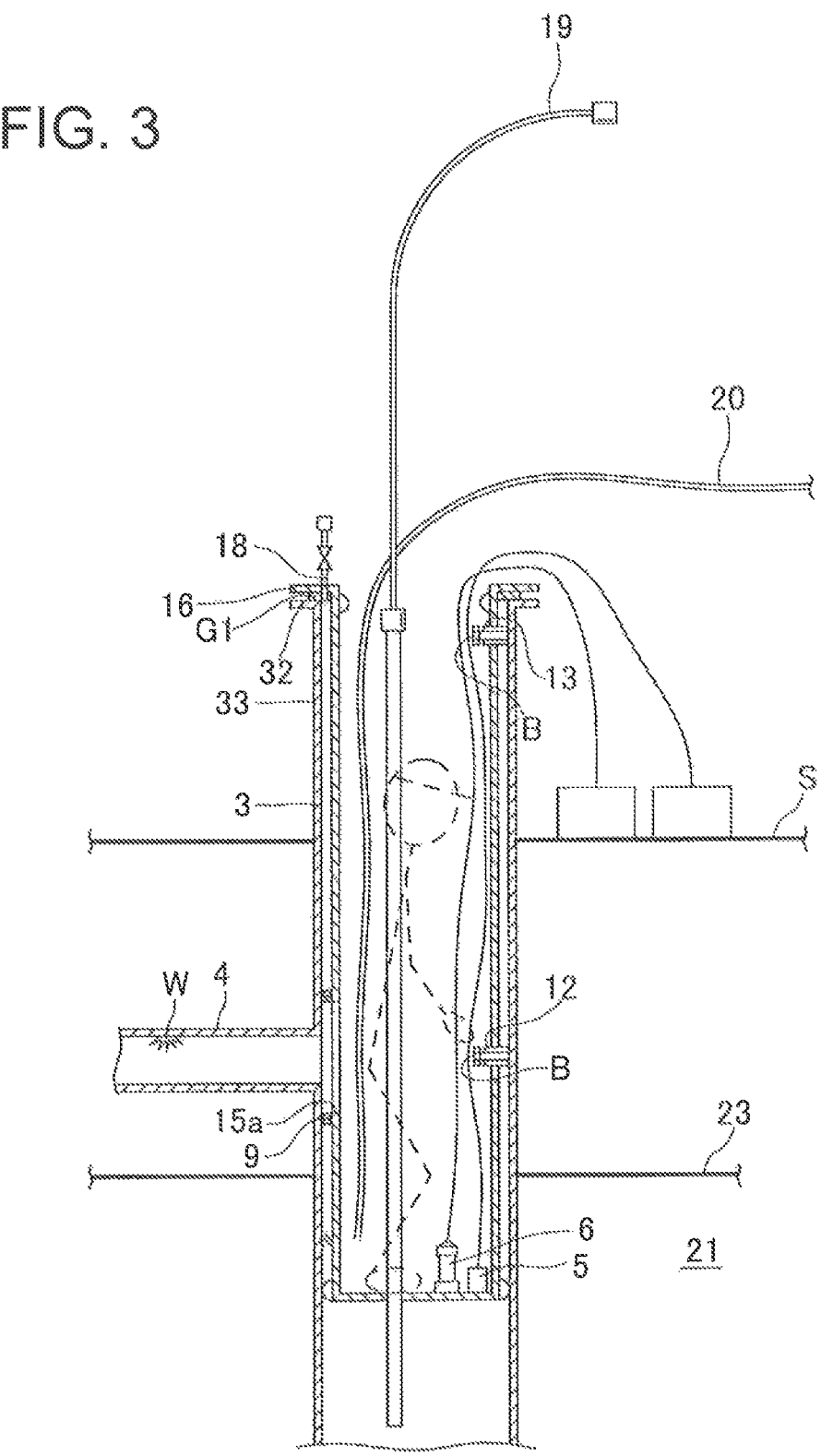
FIG. 3 is a sectional view showing the working sheath tube of FIG. 2 being inserted into the barrel.
Figure 4A:
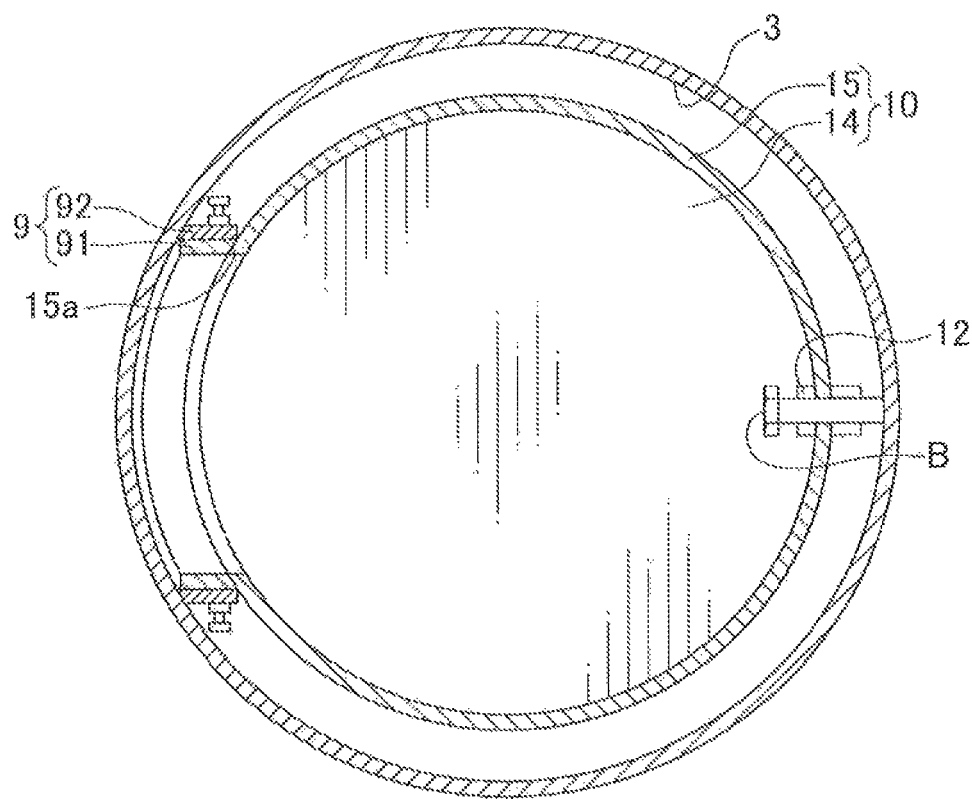
FIG. 4A is a sectional view showing a section of the working sheath tube of FIG. 3 perpendicular to an axis thereof.
Figure 4B:
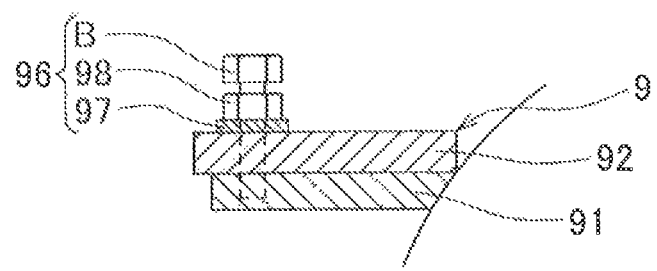
FIG. 4B is a partially enlarged view of FIG. 4A.

Further, as shown in FIG. 3, while the sheath tube main body 10 is inserted into the barrel 3, the partitioning member 9 is provided in a gap between the barrel 3 and the sheath tube main body 10. As shown in FIGS. 4A and 4B, this partitioning member 9 is configured to include: a metallic standing portion 91 standing in a tubular shape from a peripheral edge of the insertion hole 15a on the sheath tube peripheral wall 15; and a packing 92 to be fitted to an exterior of the standing portion 91. This standing portion 91 is integrally fixed to the sheath tube main body 10 using a well-known connection method such as welding.

Figure 5A:
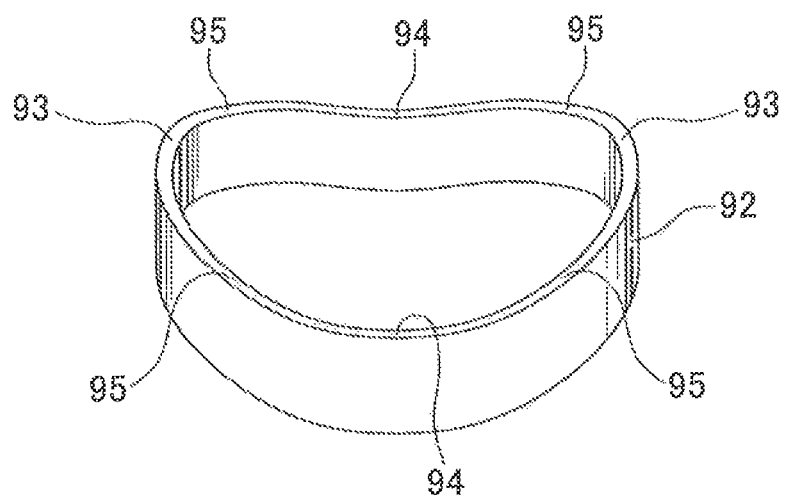
FIG. 5A is a perspective view showing a packing composing a partitioning member of FIG. 4A.
Figure 5B:
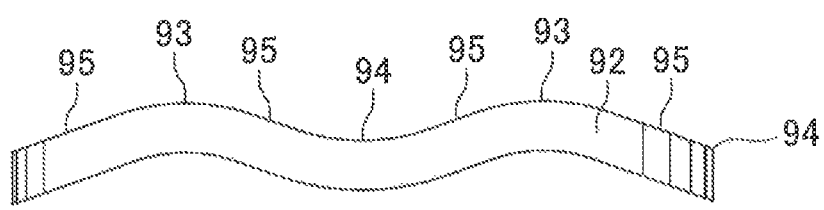
FIG. 5B is a plan view and an exploded view of FIG. 5A.

The packing 92 is made in a ring shape of elastic material such as various rubbers or elastomer. Under a condition that the sheath tube main body 10 is inserted into the barrel 3 and the packing 92 is compressed by the barrel 3, the packing 92 is projected further toward the barrel 3 side than the standing portion 91 in any positions on its whole periphery. As shown in FIGS. 5A and 5B, while the packing 92 is placed on a horizontal plane, a peripheral edge at the barrel 3 side is configured to be a waveform shape to alternately have a pair of peak portions 93 and a trough portion 94 between the pair of peak portions 93, and a gentle slope portion 95 connecting a top of the peak portion 93 with a bottom of the trough portion 94. The slope portion 95 has a slope extending along a curvature of the inner periphery of the barrel 3. In this way, while the sheath tube main body 10 is inserted into the barrel 3, the packing 92 is closely attached to the inner periphery of the barrel 3.

Such a partitioning member 9 is assembled by bolting a fixation portion 96 while the packing 92 is fitted to an exterior of the standing portion 91. The fixation portion 96 is configured to include: a bolt B; a ring-shaped gland flange 97 to be fitted to an exterior of the standing portion 91; and a nut 98 for holding the gland flange 97 between the packing 92 and the nut 98. In this embodiment, twelve fixation portions 96 are provided at regular intervals on an outer periphery of the partitioning member 9. In this way, the partition member 9 is fixed to an outer face of the sheath tube main body 10 such as to surround the insertion hole 15a.

Further, an oxygen meter 5 for measuring an oxygen concentration in the working space is provided on an upper face of the sheath tube bottom wall 14 of the sheath tube main body 10. Further, a gas detector 6 for detecting flammable gas in the working space is provided on the upper face of the sheath tube bottom wall 14 of the sheath tube main body 10. In this way, when detecting the flammable gas in the working space with the gas detector 6 while detecting the oxygen concentration in the working space with the oxygen meter 5, the safety in the working space is visualized.

The hexaplug 7 as the closing member is configured to include: first and second partitioning plates 71, 72 spaced in an axial direction of the pump-discharge pipe 4; first and second purge nozzles 73, 74 penetrating the first partitioning plate 71; and a hexaplug-fixing nut 75 for fixing the hexaplug 7 to the pump-discharge pipe 4. Each of the first and second partitioning plates 71, 72 is formed in a disc shape, and an outer diameter thereof is formed slightly larger than an inner diameter of the pump-discharge pipe 4. The first purge nozzle 73 supplies nitrogen gas (inert gas) to a partitioned space, and the second purge nozzle 74 discharges the nitrogen gas in the partitioned space to outside. Further, from the atmosphere in the partitioned space discharged by the second purge nozzle 74, it is confirmed that the first purge nozzle 73 surely supplies the nitrogen gas to the partitioned space.

Such a hexaplug 7 is inserted into the opening of the pump-discharge pipe 4 from the insertion hole 15a such that the first partitioning plate 71 is near the barrel 3 in the pump-discharge pipe 4, and the second partitioning plate 72 is positioned away from the barrel 3 via the first partitioning plate 71. In this state, the hexaplug 7 is fixed to the pump-discharge pipe 4 using the hexaplug-fixing nut 75. In this state, the nitrogen gas is supplied to the partitioned space via the first purge nozzle 73, and the nitrogen gas in the partitioned space is discharged to outside via the second purge nozzle 74. Here, when the nitrogen gas is supplied to the partitioned space via the first purge nozzle 73, the first and second partitioning plates 71, 72 are pushed away from each other by the nitrogen gas. Thereby, the hexaplug 7 can completely shut off the barrel 3 from the pump-discharge pipe 4.

Here, in this embodiment, the hexaplug 7 is used as the closing member. However, the present invention is not limited to this. A seal material such as a rubber plug and a packing may be used as long as it can close the opening of the pump-discharge pipe 4. However, using the hexaplug as the closing member is preferable because it can surely close the opening of the pump-discharge pipe 4.

Next, in the pump-discharge pipe 4, an environmental maintenance method using the working sheath tube 1 for renovating the deteriorated point W away from the barrel 3 via a place where the hexaplug 7 is installed according to this embodiment will be explained with reference to FIGS. 2, 3, and 6.

First, as shown in FIG. 2, the in-tank pump 31 installed in the barrel 3 is suspended and slightly moved up. Then, owing to the restoring force of the coil spring in the foot valve 30, the valve body is moved up to close the valve (blocking step). Then, when the nitrogen gas is supplied via a inert gas introduction pipe (not shown) connected to the pump-discharge pipe 4, the retained liquid in the barrel 3 is pushed to the tank 2. The in-tank pump 31 is further moved up to detach and take out a head plate (not shown) from the barrel 3.

Subsequently, the working sheath tube 1 suspended by a air hoist J (shown in FIG. 2) is moved close to an upper opening of the barrel 3 while inclined with respect to the barrel 3 such that the insertion hole 15a faces the pump-discharge pipe 4 in a radial direction thereof. Then, the positioning members 11 of the working sheath tube 1 touch an inner face of the barrel 3. While the working sheath tube 1 is set up such as an axis of the working sheath tube 1 is matched up with an axis of the barrel 3, the sheath tube main body 10 is positioned at the center in a radial direction of the barrel 3 by the positioning members 11, and inserted into the barrel 3. The whole sheath tube main body 10 is inserted into the barrel 3, the barrel flange 32 and the sheath tube flange 16 are overlapped with each other, and the insertion hole 15a of the sheath tube main body 10 and the pump-discharge pipe 4 are disposed opposite to each other. Then, the bolt B is pushed in the inclination correction portion 13 to correct the inclination of the sheath tube main body 10 with respect to the barrel 3. Peripheries of boltholes (not shown) of the barrel flange 32 and the sheath tube flange 16 are overlapped with each other. In this way, the axis of the barrel 3 and the axis of the sheath tube main body 10 conform to each other in a vertical direction (sheath tube arrangement step).

Here, an annular gasket G1 is held between the barrel flange 32 and the sheath tube flange 16 to close a gap therebetween. In this state, the barrel flange 32, the annular gasket G1, and the sheath tube flange 16, overlapped with each other are fixed with bolts. Incidentally, the same number of boltholes is formed on each of the barrel flange 32, the annular gasket G1, and the sheath tube flange 16. However, all the boltholes formed on each of the barrel flange 32, the annular gasket G1, and the sheath tube flange 16 are not bolted here, but alternately bolted in a circumferential direction. In this way, the working sheath tube 1 is fixed to the barrel 3. At this time, the flammable fuel gas is remained in the barrel 3. In this state, while a nitrogen-gas-supply nozzle 18 is passed through the sheath tube flange 16 and the annular gasket G1, and the nitrogen gas is supplied to the barrel 3 via a gap between the sheath tube main body 10 and the barrel 3, a discharge nozzle 19 is passed through the sheath tube bottom wall 14 of the sheath tube main body 10, and the flammable gas remained in the barrel 3 is discharged to outside.

Subsequently, the nitrogen gas is supplied to the working space via the insertion hole 15a of the sheath tube main body 10 from a side in the pump-discharge pipe 4 away from the barrel 3. In this way, the working space is purged with the nitrogen gas (purge step). Then, a concentration of the flammable gas in the atmosphere of the working space is measured using the gas detector 6 installed in the sheath tube main body 10, and it is confirmed that the flammable gas is not remained in the atmosphere of the working space.

Then, as shown in FIG. 3, oxygen is supplied to the working space using an air hose 20, and in the working space, a part of the nitrogen gas is replaced with the oxygen (namely, aired). Then, a concentration of the oxygen in the working space is measured using the oxygen meter 5 installed in the sheath tube main body 10, and it is confirmed that the concentration of the oxygen in the atmosphere is appropriate.

In this way, when detecting the flammable gas in the working space with the gas detector 6 while detecting the oxygen concentration in the working space with the oxygen meter 5, the safety in the working space is visualized. In this way, after it is confirmed that the working space is an environment not to exert a bad influence on a human, as shown in FIG. 3, an operator (human) enters the working space. Here in this embodiment, a human enters the working space. However, the present invention is not limited to this. A robot may work as long as it can do operations described below.

The operator who entered the working space firstly pushes the bolt B into the inclination correction portion 12 provided at a position facing the insertion hole 15a. Then, a gap between the barrel 3 and a periphery of the insertion hole 15a of the sheath tube peripheral wall 15 is reduced, and the packing 92 is compressed between the barrel 3 and the sheath tube main body 10, and closely attached to an inner periphery of the barrel 3. Thereby, the partitioning member 9 separates inside from outside of the ring. Substantially at the same time, the inclination of the sheath tube main body 10 with respect to the barrel 3 is finely adjusted.

Next, the hexaplug 7 is inserted into an opening of the pump-discharge pipe 4, and fixed to an interior of the pump-discharge pipe 4 with the hexaplug-fixing nut 75. Here, the first and second purge nozzles 74 are previously attached to the hexaplug 7. The nitrogen gas is injected into the partitioned space via the first purge nozzle 73, and the gas in the partitioned space including the nitrogen gas is discharged to outside via the second purge nozzle 74. Here, when the nitrogen gas is supplied via the first purge nozzle 73, the first and second partitioning plates 71, 72 are separated from each other by the nitrogen gas. Here, the flammable gas concentration of the discharged gas is measured with the gas detector, and a leak condition of the flammable gas is confirmed. In this way, the pump-discharge pipe 4 is completely closed (pump-discharge pipe closing step).

Next, the operator exits the working sheath tube 1, and as shown in FIG. 6, the bolt B of the inclination correction portion 13 is detached. Then, the annular gasket G2 is set on the sheath tube flange 16, the hoses attached to a closing flange 8 are switched to the first and second purge nozzles 73, 74, and the discharge nozzle 19, and then the closing flange 8 is bolted. Here, for example, the number of boltholes formed on the closing flange 8 is the same as the number of boltholes formed on the barrel flange 32 and on the sheath tube flange 16. Then, when all the boltholes of the closing flange 8 are bolted, the boltholes of the barrel flange 32, the sheath tube flange 16, and the annular gasket G2 are bolted.

In a state that the closing flange 8 is fixed, the first and second purge nozzles 73, 74, the nitrogen-gas-supply nozzle 18, and the discharge nozzle 19 are passed through the closing flange 8. Under this condition, a tip of the second purge nozzle 74 is closed with a cap. Then, while the nitrogen gas is supplied to the partitioned space in the hexaplug 7 to apply pressure using the first purge nozzle 73, the nitrogen gas is supplied to the barrel 3 via a gap between the sheath tube main body 10 and the barrel 3 using the nitrogen-gas-supply nozzle 18, and the atmosphere gas in the barrel 3 is discharged to outside using the discharge nozzle 19.

Then, the discharge of the atmosphere gas in the barrel 3 with the discharge nozzle 19 is stopped. At this time, because the nitrogen gas is supplied to a gap between the barrel 3 and the sheath tube main body 10 with the nitrogen-gas-supply nozzle 18, an interior of the barrel 3 is pressurized. In a state that the inner pressures of the barrel 3 and the tank 2 are matched up, it is confirmed whether a gas leak via the closing flange 8 exists or not. When it is confirmed that the gas leak does not exist, the nitrogen gas supply to the barrel 3 with the nitrogen-gas-supply nozzle 18 is stopped. Then, the pressure in the barrel 3 is monitored and is confirmed to be constant. In this way, an environment allowing a safety hot work is maintained.

After a renovating operation of the deteriorated point W of the pump-discharge pipe 4, namely, a hot work is done, the nitrogen gas supply to the barrel 3 via the gap between the barrel 3 and the sheath tube main body 10 using the nitrogen-gas-supply nozzle 18 is started. In this way, while the retained liquid (or fuel gas) is pushed back from the barrel 3 to the tank 2, the atmosphere gas in the barrel 3 is discharged via the discharge nozzle 19, and thereby the pressure in the barrel 3 is decreased to the same degree as the pressure in the storage 21 of the tank 2. Here, the flammable gas concentration in the atmosphere gas in barrel 3 discharged via the discharge nozzle 19 is measured with the gas detector 6. After it is confirmed that the flammable gas concentration in the atmosphere gas in barrel 3 is in a safe level, bolts fixing the closing flange 8 are detached, and the closing flange 8 is removed from the barrel flange 32 and the sheath tube flange 16 to expose an opening of the sheath tube main body 10. Then, the hoses of the first and second purge nozzles 73, 74, and the discharge nozzle 19 attached to the closing flange 8 are switched, and subsequently the bolt B of the inclination correction portion 13 is attached, and the sheath tube flange 16 and the barrel flange 32 are bolted. Then, the nitrogen gas is supplied via the nitrogen-gassupply nozzle 18, and the oxygen is supplied to the working space using the air hose 20. Then, while the oxygen concentration of the working space is measured with the oxygen meter 5, the flammable gas in the working space is detected with the gas detector 6 to confirm that the working space is an environment not to exert a bad influence on a human. After confirming, the operator (human) enters the working space, and the fixation of the hexaplug-fixing nut 75 is released. Then, the hexaplug 7 together with the first and second purge nozzles 73, 74 are removed from the pump-discharge pipe 4. Then, the bolt B pushed into the inclination correction portion 12 is loosened to release the pushing to the barrel 3 from the periphery of the insertion hole 15a of the sheath tube main body 10. Then, the operator exits the working sheath tube 1.

Subsequently, the bolt B of the inclination correction portion 13 is loosened, the bolts fixing the sheathe tube flange 16 and the barrel flange 32 are detached, and the fixation between the sheathe tube flange 16 and the barrel flange 32 is released. Then, the nitrogen-gas-supply nozzle 18, the discharge nozzle 19, and the air hose 20 are removed, and the working sheath tube 1 is pulled out from the barrel 3. In this way, the working sheath tube 1 is detached from the barrel 3, and a temporary closing plate (not shown) is installed to finish the series of operations.

Owing to using such a working sheath tube 1, while preventing the flammable liquid or gas from entering the pump-discharge pipe 4, the liquid or the gas can be presented from leaking outside. Thereby, an environment allowing a safety hot work associated with a renovating operation of the pump-discharge pipe 4 can be maintained.

Further, owing to using such a working sheath tube 1, the pump-discharge pipe 4 solely required to be renovated can be renovated while the operation of the tank 2 is maintained without driving out the whole fuel in the tank 2. Therefore, an renovating operation process is simplified, and for example, an equipment management such as temperature control when the fuel in the tank 2 is driven out or returned becomes unnecessary. Thereby, the time necessary for this operation is greatly reduced. Since the working sheath tube 1 has a bottomed tubular shape, when operating in the working space thereof, tools or the like are surely prevented from dropping into the barrel 3. Accordingly, a low-cost safety environment allowing a safety hot work can be maintained in a short time.

Incidentally, in the embodiment described above, the partitioning member 9 is configured to include: a standing portion 91 standing in a tubular shape from a peripheral edge of the insertion hole 15a on the sheath tube peripheral wall 15; and a packing 92 to be fitted to an exterior of the standing portion 91. However, the present invention is not limited to this. The partitioning member may be configured to include: a standing portion standing in a tubular shape from a neighbor of a peripheral edge of the insertion hole 15a for surrounding the insertion hole 15a; and a packing 92 to be fitted to an exterior of the standing portion. Further, the partitioning member may only include the packing 92. In this case, the packing 92 may be fixed to an outer periphery of the sheath tube main body 10 for surrounding the insertion hole 15a. Further, when the partitioning member includes only the packing 92, the standing portion 91 may be omitted.

The above embodiments only show preferred embodiments of the present invention, and the present invention is not limited to these embodiments. Namely, skilled person could work the present invention by variously modifying the present invention within a scope of the present invention according to conventional well-known knowledge. These modifications are still included in a category of the present invention as long as they are provided with the working sheath tube and with a configuration of the environmental maintenance method for renovating operation of pump-discharge pipe of the present invention.

REFERENCE SIGNS LIST 1 working sheath tube
2 tank
3 barrel
4 pump-discharge pipe
7 hexaplug (closing member)
15 sheath tube peripheral wall (peripheral wall)
15a insertion hole

The invention claimed is:

1. An environmental maintenance method for a renovating operation of the pump-discharge pipe using the working sheath tube,
said method comprising the sequential steps of:
a blocking step to block a flow path from the tank to the barrel;
a sheath tube arrangement step to insert the sheath tube into the barrel and to arrange an insertion hole facing the opening of the pump-discharge pipe;
a purge step to discharge an inert gas from a side of the pump-discharge pipe away from the barrel toward the barrel to purge the working space with an inert gas;
a pump-discharge pipe closing step to close the pump-discharge pipe by inserting the closing member through the insertion hole into the pump-discharge pipe.

2. The environmental maintenance method for the renovating operation of the pump-discharge pipe as claimed in claim 1,
wherein the closing member is a hexaplug.

3. The environmental maintenance method as claimed in claim 1, wherein the working sheath tube used when renovating operation of a pump-discharge pipe branched from a periphery of a tubular barrel inserted into a tank in which a fuel is retained,
said working sheath tube having a bottomed tubular shape which can be inserted into the barrel, and having a working space there inside,
wherein the insertion hole for installation of a closing member for closing a pump-discharge pipe which is provided on and penetrates a sheath tube peripheral wall, and
wherein while the sheath tube is inserted into the barrel, the insertion hole facing an opening of the pump-discharge pipe.

4. The environmental maintenance method as claimed in claim 1, wherein the working sheath tube further comprises:
a partitioning member provided in a ring shape for surrounding the insertion hole in a gap between the barrel and the peripheral wall while inserted into the barrel to separate inside from outside of the ring shape.

5. The environmental maintenance method as claimed in claim 4,
wherein the partitioning member includes:
a standing portion standing in a tubular shape from a peripheral edge or a vicinity of the insertion hole; and
a packing fitted to an exterior of the standing portion, and
wherein while the partitioning member is inserted into the barrel, the packing is closely attached to an inner periphery of the barrel.

6. The environmental maintenance method as claimed in claim 1,
   wherein a positioning portion for positioning the barrel in a radial direction while the sheath tube is inserted into the barrel is provided on an end of the sheath tube in an insertion direction side.

7. The environmental maintenance method as claimed in claim 1,
   wherein an inclination correction portion for correcting an inclination of the sheath tube with respect to the barrel while the sheath tube is inserted into the barrel is provided on the peripheral wall at a position opposite to the insertion hole.

8. The environmental maintenance method as claimed in claim 1,
   wherein an oxygen meter for measuring an oxygen concentration in the working space is provided.

9. The environmental maintenance method as claimed in claim 1,
   wherein a gas detector for detecting flammable gas in the working space is provided.

\* \* \* \* \*